United States Statutory Invention Registration [19]

Heckman

[11] Reg. Number: H373

[43] Published: Nov. 3, 1987

[54] ANTENNA STOWING AND RELEASE ASSEMBLY FOR A TERMINAL DELIVERY VEHICLE

[75] Inventor: John E. Heckman, Shell Rock, Iowa

[73] Assignee: The United States of America as represented by the Secretary of the Army, Washington, D.C.

[21] Appl. No.: 17,386

[22] Filed: Feb. 9, 1987

[51] Int. Cl.[4] ..... H01Q 1/08

[52] U.S. Cl. ..... 343/705; 343/880

*Primary Examiner*—Stephen C. Buczinski
*Assistant Examiner*—Linda J. Wallace
*Attorney, Agent, or Firm*—Anthony T. Lane; Harold H. Card, Jr.; Michael C. Sachs

[57] ABSTRACT

There is disclosed a release assembly mounted within a housing member for maintaining an antenna assembly under spring deployment compression in a terminal delivery vehicle for delivery by a projectile and wherein the release assembly is comprised of a cover member and a weight member under compressive spring forces to maintain a locking ring spring within a groove of the housing member and wherein upon impact of the TDV the inertia of the weight member against the cover member causes the locking ring spring to be withdrawn from within the groove in the housing member thereby to free the release member from the housing member and thereby permitting activation of the deployment compressive spring forces for deploying the antenna assembly from the terminal delivery vehicle.

7 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ANTENNA STOWING AND RELEASE ASSEMBLY FOR A TERMINAL DELIVERY VEHICLE

GOVERNMENTAL INTEREST

The U.S. Government has rights in this invention pursuant to contract number DAAA21-76-C-0521 awarded by the Department of the Army.

BACKGROUND OF THE INVENTION

This invention relates to a stowing and release assembly, and more particularly to a stowing and release assembly for an antenna assembly of a terminal delivery vehicle.

In the art and science of warfare, intelligence gathering is a fundamental and essential requirement for effective action and reaction. Intelligence gathering has included the use of the physical presence of human observers to witness and report observed activities, scouts or patrols, for instance, as well as passive observers, such as satellites or electronic devices to transmit data. Passive observers include electronic listening devices incorporated into a terminal delivery vehicle (TDV) wherein the TDV is assembled into a launch projectile assembly including a cartridge therefor. A terminal delivery vehicle to properly function requires deployment of an antenna assembly to permit transmission of environmental activities about the TDV once the terminal delivery vehicle has been appropriately positioned at a predetermined desired location. Deployment mechanisms for the antenna have included exposive and/or electrical mechanisms, however, such mechanisms have suffered from accidental deployment during handling, launching, and/or ballistic transmission.

OBJECTS OF THE INVENTION

It is an object of the present invention to provide an improved release assembly for an antenna assembly of a terminal delivery vehicle.

A further object of the present invention is to provide an improved release assembly for an antenna assembly of a terminal delivery vehicle which release assembly substantially obviates the possibility of each activation during handling or launching of the projectile including the terminal delivery vehicle.

Another object of the present invention is to provide an improved release assembly for an antenna assembly of a terminal delivery vehicle capable of withstanding stresses generated in the launching of the projectile.

Yet another object of the present invention is to provide an improved release assembly for an antenna assembly of a terminal delivery vehicle for maintaining the antenna assembly in a stored mode during flight of the projectile.

Still another object of the present invention is to provide an improved release assembly for an antenna assembly of a terminal delivery vehicle capable of effecting automatic release of the antenna assembly from the projectile upon impact thereof.

Yet another object of the present invention is to provide an improved release assembly for an antenna assembly of a terminal delivery vehicle of reliable repetitive deployment capability.

SUMMARY OF THE INVENTION

These and other objects of the present invention are achieved by a release assembly mounted within a housing member for maintaining an antenna assembly under spring deployment compression in a terminal delivery vehicle for delivery by a projectile and wherein the release assembly is comprised of a cover member and a weight member under compressive spring forces to maintain a locking ring spring within a groove of the housing member and wherein upon impact of the TDV the inertia of the weight member against the cover member causes the locking ring spring to be withdrawn from within the groove in the housing member, thereby to free the release member from the housing member and permitting activation of the deployment compressive spring forces for deploying the antenna assembly from the terminal delivery vehicle.

BRIEF DESCRIPTION OF THE DRAWINGS

Further objects and advantages of the present invention will become apparent from the following detailed description of an embodiment thereof especially, when taken with the accompanying drawings, wherein.

DETAILED DESCRIPTION OF THE DRAWINGS

Figure 1:
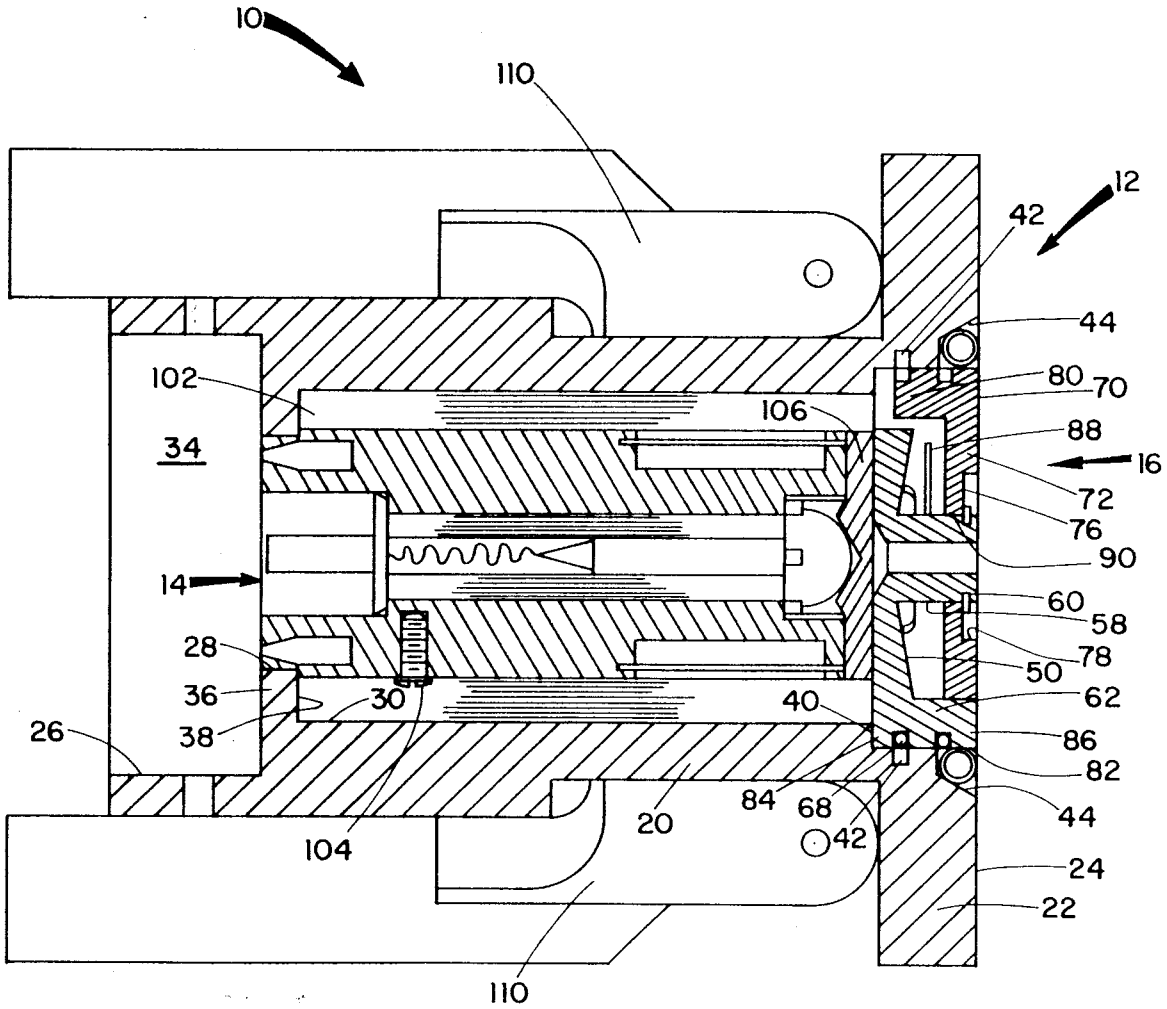
FIG. 1 is a cross-sectional view of a housing member for a projectile illustrating the present invention.
Figure 2:
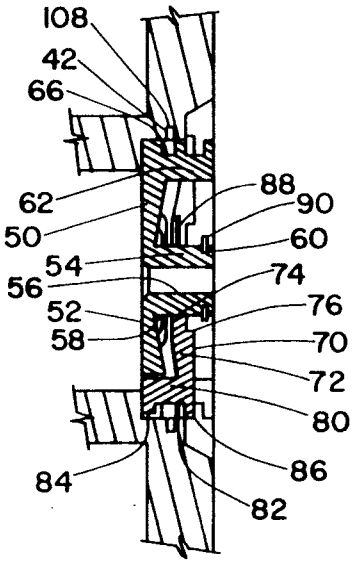
FIG. 2 is a cross-sectional view of the release assembly in compressed configuration.
Figure 3:
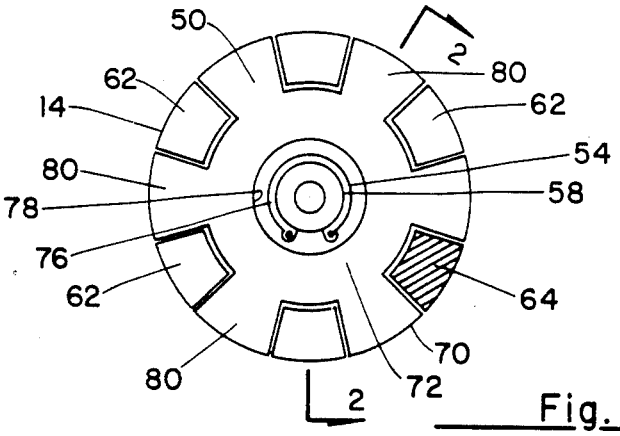
FIG. 3 is a front view of the release assembly.

Referring now to the drawings, and particularly to FIG. 1, there is illustrated a housing member for a terminal delivery vehicle assembly for positioning within a projectile assembly (not shown), generally indicated as 10, and including a base member, generally indicated as 12, in which is positioned a spring loaded antenna assembly, generally indicated as 14, maintained within the housing assembly 10 by an antenna release assembly, generally indicated as 16, resiliently mounted within the base member 12, as more fully hereinafter discussed.

The base member 12 is formed of a generally cylindrically-shaped body portion 20 and an end flange portion 22 including an end surface 24. The body portion 20 of the base member 12 is formed with a plurality of cylindrically-shaped interior surfaces 26, 28, 30, and 32 (from left to right) of varying diameters defining a chamber 34, referring particularly to FIG. 1.

Interior surface 26 is of a great diameter than interior surface 28 which is of a smaller diameter than interior surface 30 thereby defining an intermediate flange member 36 including a shoulder portion 38 for a portion of the chamber 34 defined by the interior surface 28. The interior surface 32 is slightly larger than the interior surface 30 thereby defining a shoulder portion 40 proximate the end flange portion 22.

The interior surface 32 of the housing member 10 is formed with a groove 42 extending circumferentially therearound. From the interior surface 32, there is formed a frusto conically-shaped surface 44 extending outwardly toward the end surface 24 of the end flange portion 22 of the base member 12.

The antenna release assembly 16 is comprised of a cover member 50 including a disc-shaped end portion 52 and a shaft portion 54 extending perpendicularly therefrom and formed with a centrally-disposed channel 56 extending therethrough. About an outer surface 58 of the shaft portion 54, there is formed a circumferentially-extending groove 60. The cover member 50 is formed with a plurality of outwardly-extending sector portions 62 about a periphery of the disc-shaped end portion 52 defining therebetween opened sector areas 64. The sector portions 62 are formed with a groove 66 disposed about a peripheral surface thereof and in a plane perpendicular to the axis of the cover member 50.

The antenna release assembly 16 is further comprised of a weight member 70 including a disc-shaped portion 72 including a bore 74 defining a shoulder portion 76 with a bore 78 of a diameter slightly larger than the bore 74 thereof. About a periphery of the disc-shaped portions 72 the weight member 70 is formed with a plurality of sector-shaped arm members 80 extending in a direction parallel to the axis of the weight member 70. About a peripheral surface of each of the arm members 80, there is formed a channel 82 defined by arc-shaped parallelly-disposed outer and inner ridge elements 84 and 86. The arm members 80 of the weight member 70 are dimensioned to cooperate with the sector areas 64 of the cover member 50 as more fully hereinafter discussed.

The weight member 70 is positioned on the shaft portion 54 of the cover member 50 after positioning of a spring assembly 88 into a compressed mode about the shaft portion 54 by the interrelationship of said members and is maintained thereon by positioning a retaining ring 90 in the groove 60 formed in the outer surface 58 of the shaft portion 54 of the cover member 50. In such configuration, the cover member 50 and weight member 70 are maintained apart from each other limited by the retaining ring 90 and may be compressed together into an armed position against the compression spring forces of the spring assembly 88. In the armed position, as illustrated in FIG. 1, the outer ridge element 84 of the arm members 80 of the weight member 70 are coincident with the peripheral groove 66 formed in each of the sector portions 62 and form a groove of a larger diameter than the groove 66 as more fully hereinafter discussed.

Figure 4:
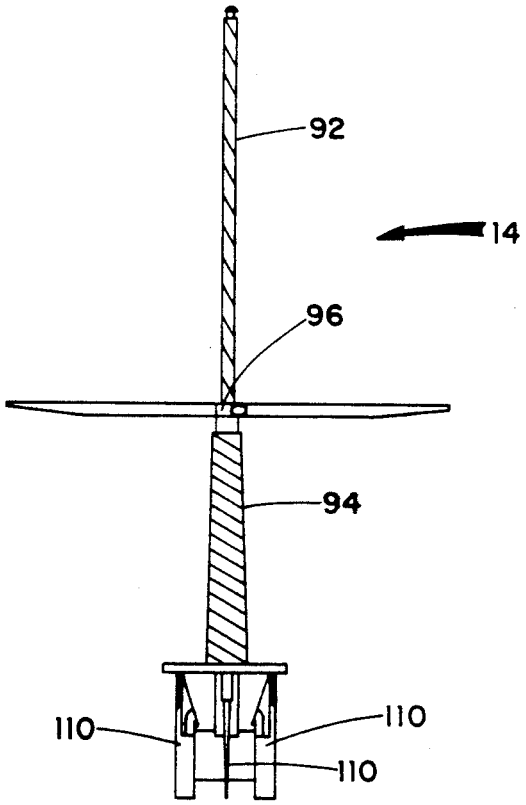
FIG. 4 is an elevational view of the TDV with antenna deployment.

The antenna assembly 14 is comprised of upper and lower band members 92 and 94 mounted together by intermediate member 96, and as illustrated in FIG. 4, are in an uncoiled mode. In FIG. 1, the upper and lower band members 92 and 94 are in a coiled mode ready for deployment.

The housing member 10 is mounted to a base of a terminal delivery vehicle (not shown), referring now to FIG. 1, after the assembly of the component parts of the housing member 10. The antenna assembly 14 is positioned within a sleeve member 102 including locking screws 104 and is disposed within the chamber 34 of the base member 12 and a holding plate 106 disposed thereon. Thereafter the antenna release assembly 16 is positioned within the channel 34 with the cover member 50 in contact with the holding plate 106, such that a split locking ring 108 under compression is positioned in the groove 42 and about an outer surface of inner ridge element 86 of the weight member 70, with the cover member 50 and weight member 70 in an opened position. Further assembly of the complete projectile assembly will be understood by one skilled in the art, as well as the launch of the projectile of such projectile assembly, including the terminal delivery vehicle.

The terminal delivery vehicle is separated from the launching projectile at a predetermined time after the launch as determined by ballistic trajectory, etc., to cause the terminal delivery vehicle with the aid of terra brakes 110 to impact into a predetermined area and stop thereby in the surface thereof. Upon impact, the inertia of the weight member 70 against the compressive forces of spring assembly 88 causes the weight member 70 to move towards the cover member 50 whereby the split locking spring 108 in the groove 42 under compressive forces in an outwardly and radially expanded direction and disposed about the outer surface of the inner ridge element 86 is permitted to assume a circular configuration in the groove 42 of the weight member 70 and thereby withdraw from the groove 42 in the base member 12 thereby to permit separation of the antenna release assembly 16 from the base member 12. Separation of the antenna release assembly 16 from the base member 12 permits deployment of the antenna assembly 14, in particular the upper and lower band members 92 and 94, referring now to FIG. 4, as a result of the band members being under coiled spring tension in the assembled configuration as illustrated in FIG. 1.

While the invention herein has been described in connection with an exemplary embodiment thereof, it will be understood that many modifications will be apparent to those of ordinary skill in the art and that this application is intended to cover any adaptations or variations thereof.

What is claimed:

1. In a terminal delivery vehicle having a base member including a storage chamber for an antenna assembly disposed in coiled configuration wherein said base member includes an end chamber of larger diameter than said storage chamber, a stowage and release assembly for retaining said antenna assembly in said storage chamber until deployment which comprises:

a cover member;

a weight member positioned for axial movement with respect to said cover member;

means for limiting movement of said weight member with respect to said cover member;

means for maintaining said members in spaced apart relationship; and means for mounting said storage and release assembly within said end chamber of said base member of said terminal delivery vehicle.

2. The stowing and release assembly as defined in claim 1 wherein said cover member includes a shaft portion formed with a groove and wherein said weight member is formed with a base for positioning on said shaft of said cover member and wherein said means for limiting movement is a retaining ring disposed in said groove of said cover member.

3. The stowing and release assembly as defined in claim 2 wherein said end chamber of said base member is formed with an inwardly-extending groove for receiving a retaining ring under compression upon positioning said stowage and release assembly in said end chamber.

4. The stowing and release assembly as defined in claim 3 wherein said weight member is provided with arm portions for cooperating with and for maintaining said retaining ring under compression.

5. The stowing and release assembly as defined in claim 4 wherein said means for maintaining said members in spaced apart relationship is a coil spring.

6. The stowing and release assembly as defined in claim 4 wherein said arm portion of said weight member is provided with a peripherally-formed groove and wherein said cover member is provided with arm portions having a peripherally-formed groove whereupon compression of said weight member with respect to said cover member permits said retaining ring to snap into said grooves and thereby free said stowage and release assembly from said base member.

7. The stowing and release assembly as defined in claim 6 wherein said cover member and said weight member are provided with open sector portions for cooperating with arm portions of respective members.

* * * * *